May 8, 1934.  E. A. DICKEY  1,958,237
BRAKE MECHANISM FOR MOTOR VEHICLES
Filed May 17, 1932
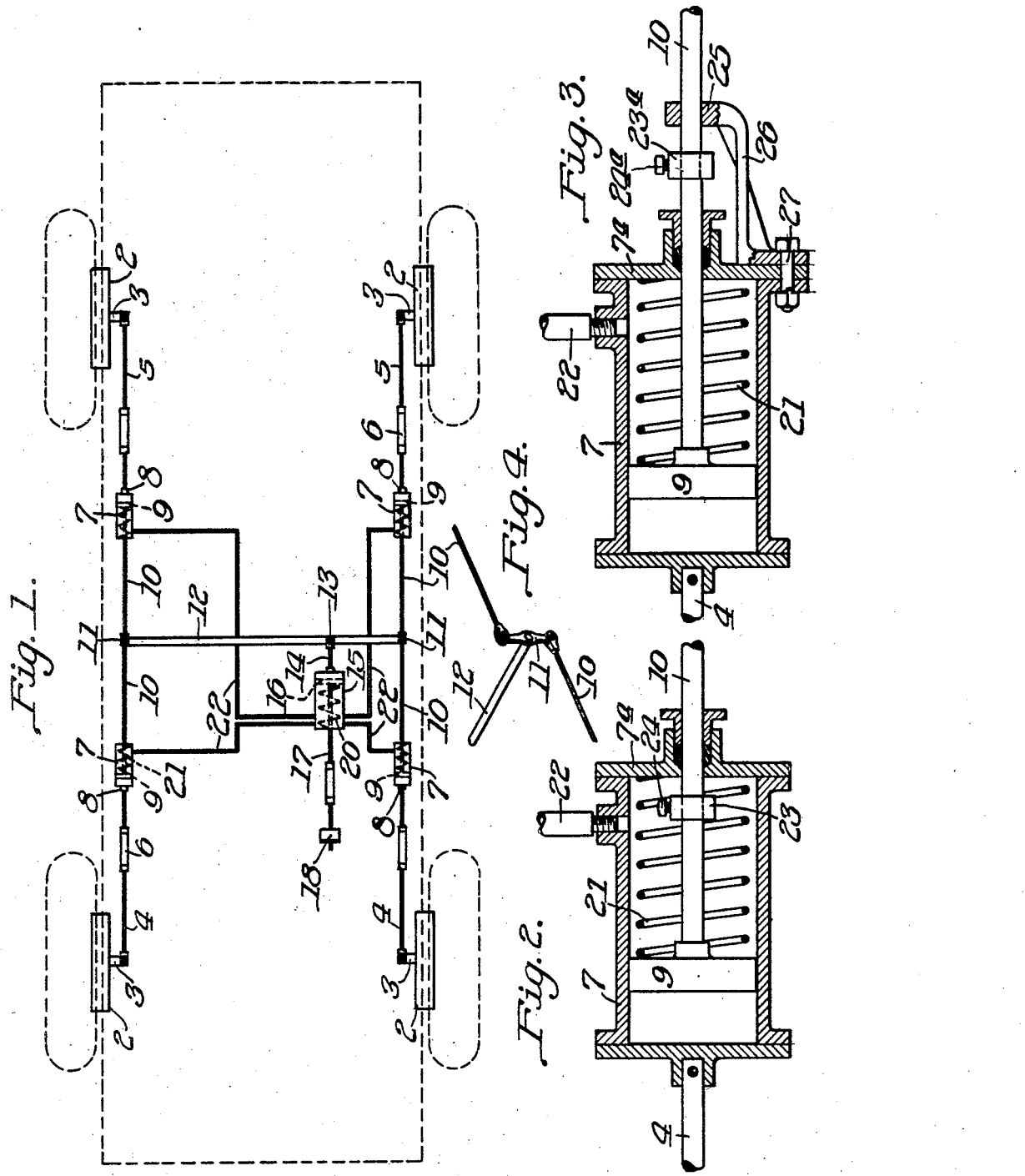
INVENTOR.
Edward A. Dickey
BY
O. M. Clarke
ATTORNEY Patented May 8, 1934

1,958,237

UNITED STATES PATENT OFFICE 1,958,237

BRAKE MECHANISM FOR MOTOR VEHICLES

Edward A. Dickey, Aliquippa, Pa.

Application May 17, 1932, Serial No. 611,863

6 Claims. (Cl. 188—152)

My invention relates to improvements in equalizing brake systems for motor driven vehicles such as automobiles, trucks, and the like. It is of the same general construction as that disclosed in my prior application filed April 19, 1932, No. 606,140, the present improvement referring particularly to means for limiting movement of the fluid actuated piston rod to effect mechanical contact between it and the piston cylinder or a portion thereof, for mechanical transmission.

In the drawing illustrating the invention:

Fig. 1 is a general plan view showing the complete system as utilized on a motor driven vehicle;

Fig. 2 is an enlarged sectional detail view of one of the brake rod cylinders, showing the rod provided with a limiting abutment engageable with the cylinder end;

Fig. 3 is a similar view showing a construction in which an abutment on the piston rod is engageable with an exterior bracket;

Fig. 4 is a perspective detail view of the rock shaft levers.

Referring to the drawing, 2 are the usual brake drums of a four wheel truck, each having a lever actuated rocking pin or cam shaft 3 operable to effect frictional braking resistance by tension of the pair of front connecting rods 4 and rear connecting rods 5. Each of said rods is provided with a turnbuckle 6 for adjustment thereof as may be required.

A series of four floating or movable service cylinders 7 are located in alinement with the connecting rods 4 and 5, and are connected as at 8 with each rod, whereby each cylinder becomes the pulling connecting link element of each rod. Within each cylinder is a piston 9 secured to the end of a secondary connecting rod 10, the other end of which is secured to the end of a double acting lever 11, one at each side of the equipment.

Said levers are mounted on the ends of a transverse rock shaft 12 mounted in bearings on the chassis frame, and having an actuating lever 13. Lever 13 is provided with a connecting rod 14 secured to the end of a master cylinder 15 having a piston 16 which in turn is provided with a rod 17 extending through the end of the cylinder and connected to the pedal actuated lever 18 having the usual pivotal bearing. Between the piston 16 and the end of the cylinder is a retracting spring 20 for resumption of normal position after each operation, and a similar spring 21 is inserted between each piston 9 and the opposite end of the several service cylinders 7.

A flexible tubing or piping system consisting of individual conductors 22 directly connects each service cylinder 7 with the master cylinder 15, maintaining a continuous column of liquid, as oil, from the master cylinder to and throughout the interior of the several service cylinders and their communicating connections. Such liquid being incompressible, it constitutes a mobile abutment or link between the pistons 9 and the end of each service cylinder 7 when held therein by the piston 16 of master cylinder 15. The forward movement of treadle 18, depending upon its extent of movement, will displace the liquid in the cylinder 15 to a corresponding degree, effecting simultaneous charging of liquid into each service cylinder 7.

Under such conditions, any slack throughout the full extent of each compound connecting rod and cylinder assemblage 4—7—10, between levers 11 and 3, is taken up, and the continuous connection between the levers is then practically rigid, by reason of the presence under pressure of the liquid in each service cylinder, avoiding any undesirable lost motion.

Continued pressure of the pedal, acting through the then immobile body of liquid in master cylinder 15, moves said cylinder and connecting rod 14 forwardly. Rock shaft 12 is thus rotated, actuating levers 11, and transmitting the brake applying or setting movement to the several connecting rod 4 and 5 assemblies, for simultaneous setting of the brakes for each of the four wheels of the truck. Upon release of pressure of the treadle, the tension due to liquid pressure will be relieved, assisted by springs 20 and 21, with relaxation and resumption of normal position of the parts, ready for the next application.

Ordinarily, the presence of liquid under pressure from master cylinder 15 maintains a body of resisting liquid in each service cylinder 7, by a connection 22, to the interior of the cylinder between its piston 9 and the opposite end 7a, through which connecting rod 10 projects. So long as such liquid supply is maintained without material diminution or loss, the cylinder will function between the connections 10 and 4 with lever 11, to transmit actuating motion to the wrist pin of cam shaft 3 of each brake drum 2.

Upon failure or material diminution of such liquid supply however, the piston 9 may entirely compress spring 21, allowing the piston to move unduly before coming into arresting engagement, through the spring, with the end 7a of the cylinder, thereby exhausting the entire actuating movement of levers 11, without brake application.

In order to obviate such possibility and also to provide means whereby the cylinders will be always operative, either with or without the liquid supply, I have provided means for making definite arresting contact between the movable connecting rod 10 and the cylinder 7, or a portion of it, whereby to effect a pulling interlock between these two elements to effect positive transmission through the cylinder to the opposite connecting rod 4.

In the construction shown in Fig. 2 an adjustable abutment in the form of a collar 23 having a tightening set screw 24 is mounted around the connecting rod 10 within the cylinder, at suitable distance between its ends 7a and the piston 9 to allow for a limited degree of movement, and then come into abutting engagement with the cylinder end.

In the construction of Fig. 3 a similar collar 23a having an adjusting set screw 24a is mounted on the connecting rod 10 outwardly beyond the end 7a of the cylinder, and in operative relation to an abutment 25. Such abutment is in the form of a terminal or bracket 26, bolted as at 27 to the cylinder flange, or otherwise secured for good practice.

With either construction the collar 23 or 23a may be suitably set, and the mechanism will function under exercise of the liquid supply from the individual conduits 22, the abutments having free clearance at each end beyond the limited range of normal piston and cylinder relative movements.

In the event however of leakage failure or entire absence of the liquid supply, pulling piston rod 10 will be definitely brought into arresting engagement so as to positively transmit motion through the thus relatively fixed elements of the cylinder, to the opposite connecting rod 4, upon actuation of rock shaft 12. The rock shaft in such case may be actuated through the master cylinder in the same general manner above described.

The particular abutment devices illustrated may be substituted by any other equivalent means, it being understood that the mechanism is intended to effect a positive interlocking connection under the conditions disclosed, or as normal equipment and operation.

What I claim is:

1. In combination with a motor truck or the like provided with a master cylinder and piston and an actuating element therefor, a plurality of wheel brakes, a power imparting member connected with the master cylinder, a connecting rod member between each brake and the power imparting member having a compensating service cylinder and piston rod, means providing mechanical arrest of movement between the cylinder and piston rod, and a liquid conduit connecting the service cylinder with the master cylinder.

2. In combination with a motor actuated vehicle provided with a power transmitting shaft having connecting rod levers, an operating lever, and a liquid-containing master cylinder and piston operatively connected with the power shaft and operating lever; running gear for the vehicle having brake mechanism, a plural member connecting rod between each brake mechanism and a lever of the power shaft provided with an intermediate service cylinder and piston oppositely connected with sections of the connecting rod, means providing positive arrest of movement of the piston with relation to the cylinder, and a liquid conduit connecting each service cylinder with the master cylinder.

3. In a motor driven vehicle provided with a pressure exerting master cylinder, wheel braking mechanism providing means for applying braking action to each wheel, a two-section connecting rod for each wheel brake, one section having a piston and the other a cylinder, means supplying liquid from the master cylinder to the connecting rod cylinder exerting tension on one of said sections, means providing a stop abutment between such section and the connecting rod cylinder, and a power imparting member connecting each two-section connecting rod with the master cylinder.

4. In a motor driven vehicle provided with a plurality of wheels and a fluid actuated pressure exerting master cylinder and piston, a power imparting member connected with the master cylinder, wheel braking mechanism providing means for applying braking action to each wheel, a two-section connecting rod for each wheel brake, one section having a piston and rod connected with the power imparting member and the other having a service cylinder engaging said piston and connected with a wheel brake, a conduit connecting each service cylinder with the master cylinder, and means providing arrest of movement of the service cylinder piston rod.

5. In combination with a motor driven vehicle having wheel brakes and means for transmitting motion including an actuating member and a pedal operated master cylinder, means for transmitting braking movement from the actuating member to the several wheel brakes comprising a series of two-section connecting rods connecting the actuating member with the several brakes, one section having a piston and the other a cylinder, a conduit connecting each of said cylinders with the master cylinder, and an abutment adjustably mounted on each piston connecting rod and a co-acting abutment on its cylinder.

6. In combination with a motor driven vehicle having wheel brakes, a rock shaft having brake levers, and a pressure exerting master cylinder connected with the rock shaft; a two-section connecting rod for each brake connected to one of said brake levers, a cylinder connected to one connecting rod section, a piston in the cylinder connected to the other connecting rod section, a retracting spring for the piston, and an abutment connected with the piston engageable with a limiting element of the cylinder terminating its movement with its connecting rod secton.

EDWARD A. DICKEY.